United States Patent
Bawks

(10) Patent No.: US 8,113,088 B2
(45) Date of Patent: Feb. 14, 2012

(54) TORQUE PROPORTIONING DIFFERENTIAL

(75) Inventor: James Robert Bawks, Harrison Township, MI (US)

(73) Assignee: Eaton Corporation, Southfield, MI (US)

( * ) Notice: Subject to any disclaimer, the term of this patent is extended or adjusted under 35 U.S.C. 154(b) by 433 days.

(21) Appl. No.: 12/327,934

(22) Filed: Dec. 4, 2008

(65) Prior Publication Data

US 2010/0144484 A1    Jun. 10, 2010

(51) Int. Cl.
*F16H 48/12* (2006.01)

(52) U.S. Cl. .......................................... 74/650; 475/249

(58) Field of Classification Search .................... 74/650, 74/665 R; 475/230, 231, 232, 235, 248, 475/249

See application file for complete search history.

(56) References Cited

U.S. PATENT DOCUMENTS

| 4,365,524 | A |   | 12/1982 | Dissett et al. ............... 74/715 |
| 4,424,725 | A |   | 1/1984  | Bawks ......................... 74/650 |
| 5,169,370 | A | * | 12/1992 | Dye et al. ..................... 475/227 |
| 5,221,238 | A |   | 6/1993  | Bawks et al. ................ 475/226 |
| 5,362,284 | A | * | 11/1994 | Brewer ......................... 475/249 |
| 5,556,344 | A | * | 9/1996  | Fox .............................. 475/235 |
| 5,713,812 | A | * | 2/1998  | Hiraishi et al. .............. 475/252 |
| 5,957,801 | A | * | 9/1999  | Barnes, II .................... 475/249 |
| 6,402,656 | B1 | * | 6/2002 | Peralta ......................... 475/252 |
| 7,264,569 | B2 |   | 9/2007 | Fox .............................. 475/241 |
| 7,438,661 | B2 |   | 10/2008 | Kyle et al. .................... 475/232 |

* cited by examiner

*Primary Examiner* — Justin Holmes
(74) *Attorney, Agent, or Firm* — Bliss McGlynn, P.C.

(57) ABSTRACT

A differential gear mechanism including a gear case having a body defining a gear chamber having a pair of opposed openings with a pair of output gears rotatably supported in the gear chamber adjacent to the openings. At least one of the output gears has a hub with a tapered portion facing an adjacent opening. At least one of the openings includes an inner chamfer portion that corresponds to an adjacent tapered portion. The gear case and gear set cooperate to move the output gear such that the tapered portion is disposed in frictional, torque translating engagement with a chamfered portion to bias torque translated through the differential to the output shafts under predetermined conditions.

16 Claims, 4 Drawing Sheets

TORQUE PROPORTIONING DIFFERENTIAL

BACKGROUND OF THE INVENTION

1. Field of the Invention

The present invention is directed toward differentials, in general, and more specifically, to a differential having torque proportioning capabilities.

2. Description of the Related Art

A differential is a component of an axle assembly and is used to couple a pair of rotating half shafts which make up a portion of the axle assembly. The differential is driven by the drive shaft via a pinion gear that meshes with a ring gear on the differential. In automotive applications, the differential allows the tires mounted at either end of an axle assembly to rotate at different speeds. This becomes important, for example, when the vehicle is turning. The outer tire travels over an arc of greater distance than the inner tire. Thus, the outer tire must rotate at faster speeds than the inner tire to compensate for the greater distance travelled.

Differentials include a gear set that allows for this relative rotation. However, when one tire is supported on a slippery surface, such as ice or mud, and the other is solidly supported, such as on dry pavement, an "open" differential gear set acts to transfer all power to the tires supported on the slippery surface. In this case, the tire on the slippery surface will spin and the tire on the dry pavement will not. Under these circumstances, the vehicle having an open differential can effectively become immobilized. Thus, it is known in the art to have differentials that function to transfer the torque from the slipping tire to the tire that is solidly supported. In this way, the vehicle is able to employ the traction at the solidly supported tire to move the vehicle.

There are a number of differential mechanisms that are known in the related art for use in distributing torque between the output shafts. One such differential employs a gear case having a pair of output or side gears that are rotatably supported within the gear case and fixed to respective ones of the output shafts that interconnect the differential with each tire driven by an associated axle. A plurality of pinion gears are also rotatably supported in the gear case. In the event of a differential in torque required at the tires—such as when one tire is slipping and the other tire is solidly supported when driving forward—the gear case, pinions and side gears cooperate to deliver a greater proportion of the torque to the solidly supported tire. In this way, the differential acts to automatically deliver more torque to the tire that needs it.

While torque proportioning differentials of the type generally known in the related art have worked well for their intended purposes, there is a constant need to improve the efficiency of their operation, to reduce losses due to mechanical interaction and increase the torque delivered via the differential to the output shafts. The present invention is directed toward increasing the efficiencies of torque proportioning differentials.

SUMMARY OF THE INVENTION

The present invention overcomes the deficiencies in the related art in a differential gear mechanism that supplies torque from a drive shaft to a pair of aligned output shafts. In one embodiment, the differential gear mechanism includes a gear case having a body that defines a gear chamber having a pair of opposed openings adapted to support a corresponding pair of axle half shafts defining an axis of rotation. A gear set, including a pair of output gears, is rotatably supported in the gear chamber adjacent to a corresponding opening. At least one of the output gears includes a hub having a tapered portion that faces an adjacent opening. At least one of the openings defines an inner chamfered portion that corresponds to an adjacent tapered portion on the hub of one of the output gears. The gear case and gear set cooperate to move the output gear such that the tapered portion is disposed in frictional, torque translating engagement with the chamfered portion on an adjacent corresponding opening to bias the torque translated through the differential to the output shafts under predetermined conditions. In this way, more torque is translated to the solidly supported tire of the vehicle, for example, thus increasing the efficiency of the torque proportioning differential.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
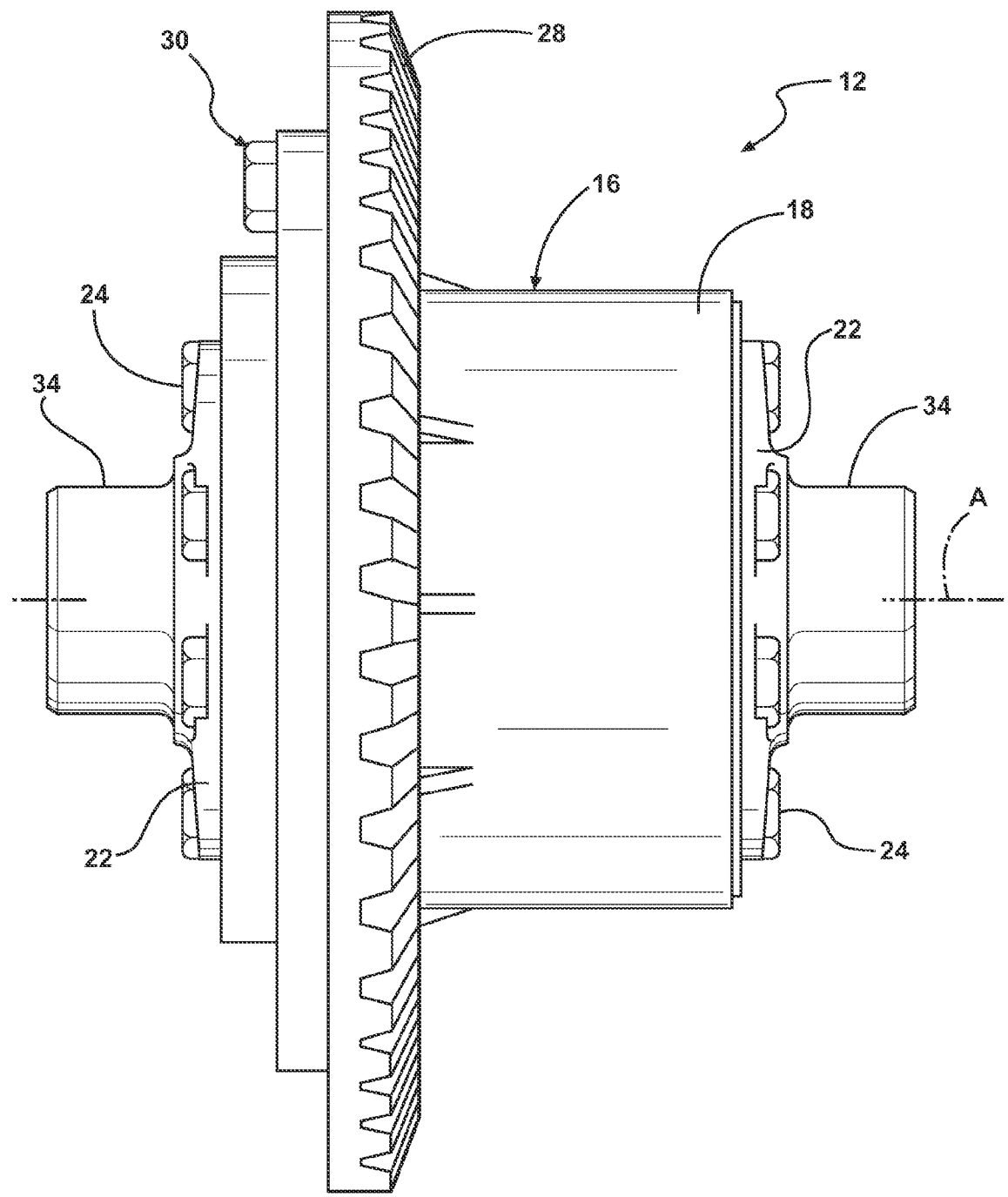
FIG. 1 is an elevational side view of a gear case of a differential of the present invention.
Figure 2:
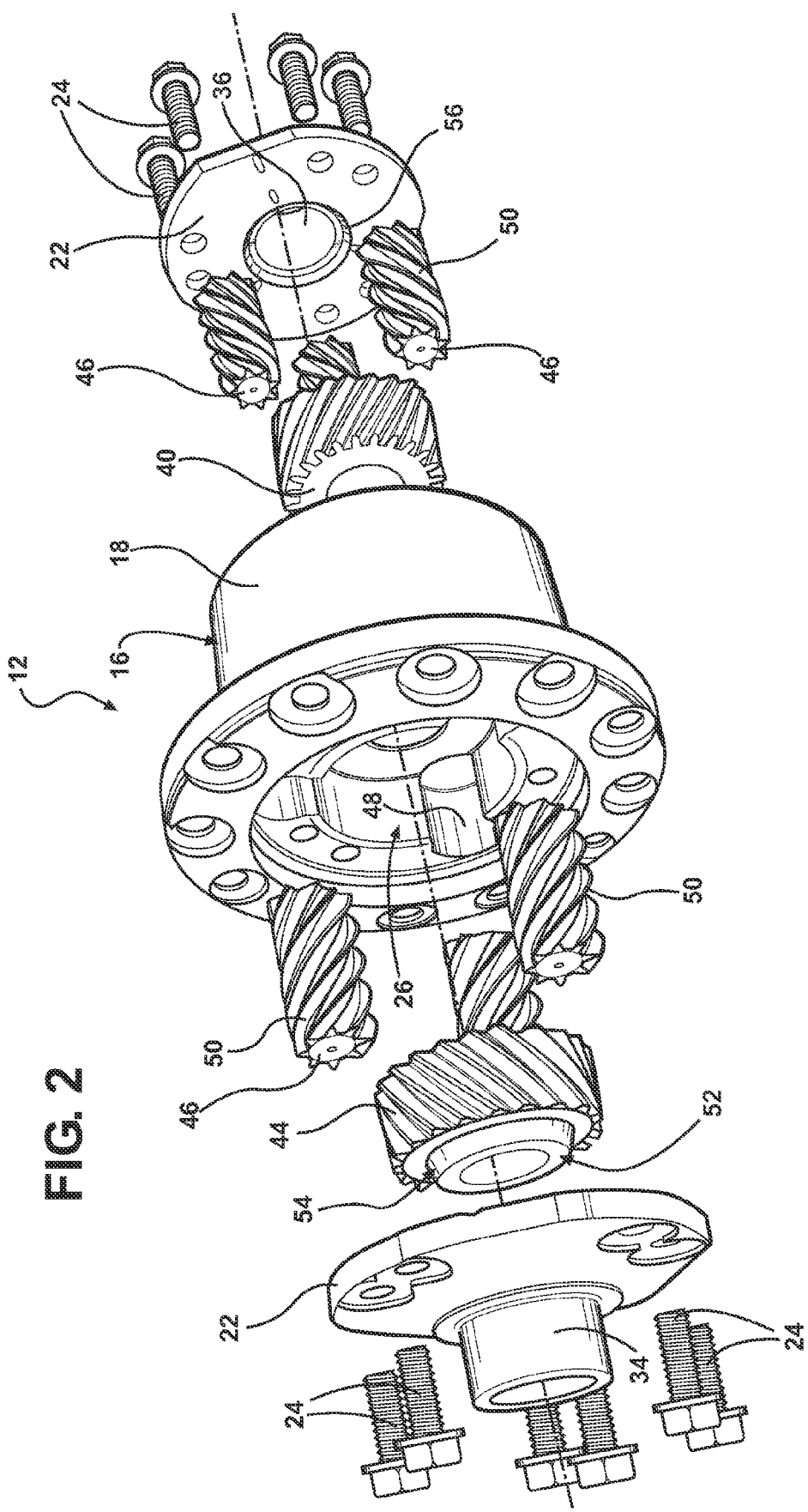
FIG. 2 is an exploded view of the differential gear case of the present invention illustrating the gear set.

A representative portion of a vehicle drivetrain for supplying torque from a drive shaft 10 (FIGS. 3 and 4) to a pair of aligned output shafts is generally illustrated in FIGS. 1-4, where like numerals are used to designate like structure throughout the drawings. Those having ordinary skill in the art will appreciate from the description that follows that the purpose of the figures is to illustrate one example of the invention and are not meant to limit it. The drivetrain includes a differential gear mechanism, generally indicated at 12 and that is operatively supported in a differential housing illustrated in phantom at 14 in FIGS. 3 and 4. The differential gear mechanism 12 of the present invention is a torque sensitive, torque biasing class of traction differential.

The differential gear mechanism 12 includes a gear case, generally indicated at 16, having a flanged body 18 that defines a gear chamber, generally indicated at 26. The gear chamber 26 has a pair of openings that are adapted to support a pair of axle half shafts as will be described in greater detail below. In the embodiment shown in FIGS. 3 and 4, the flanged body 18 has a pair of opposed ends 20. A pair of covers 22 are operatively mounted to respective ones of the opposed ends 20 of the flanged body 18 via fasteners, such as bolts 24. Thus, in the embodiment illustrated here, the flanged body 18 and covers 22 cooperate to define a gear chamber 26 in FIGS. 2-4, as will be described in greater detail below. While the embodiment of the differential gear mechanism 10 includes a flanged body 18 having a pair of covers 22 as illustrated in the figures, those having ordinary skill in the art will appreciate that the flanged body may have only one cover or may be otherwise configured in a number of different ways so as to define the gear chamber 26 without departing from the scope of the present invention. In the embodiment illustrated in these figures, each of the covers 22 includes a bearing hub 34 that defines a central passage 36 that is adapted to rotatably support respective half shafts, not shown but commonly known in the related art. A ring gear 28 is operatively mounted to the flanged body 18 via fasteners such as the nut and bolt arrangement, generally indicated at 30 in FIGS. 3 and 4. The drive shaft 10 has a pinion gear 32 that is disposed in meshing relationship with the ring gear 28 to drive the gear case 16 and thus the output shafts as will be described in greater detail below.

The differential gear mechanism 12 also includes a gear set, generally indicated at 38. Those having ordinary skill in the art will appreciate that the gear set may include any number of gears designed to provide differential action as between the half shafts. In the representative example illustrated in the figures, the gear set includes a pair of side or output gears, generally indicated at 40. The output gears 40 are rotatably supported in the gear chamber 26 adjacent to a corresponding cover 22 so as to define an axis of rotation A. To this end, the output gears 40 include splined inner diameters 42 that cooperate with corresponding splines on the half shafts for rotation therewith. In addition, each of the output gears 40 include helical gear teeth 44 formed on the outer diameter of the gear. The gear set 38 may also include a plurality of pinion gears 46 rotatably supported in the gear chamber 26. In the representative example illustrated in the figures, the gear set 38 includes three pairs of pinion gears 46. At least one pair of the pinion gears 46 mesh with at least one of the output gears 40 and another set of the pinion gears meshes with the other output gear 40. In addition, two sets of the pair of pinion gears 46 mesh with each other. However, those having ordinary skill in the art will appreciate that the gear set 38 may include any number of pairs of pinion gears 46 meshing with any other gear in the gear set so as to function in a torque-proportioning way as described in greater detail below. The flanged body 18 includes a plurality of pinion pockets 48. Each of the plurality of pinion gears 46 is rotatably supported in an associated pocket 48 in the flanged body 18. The pinion gears 46 include an outer diameter having helical gear teeth 50 formed thereon. In one embodiment, each pinion gear 46 may form one half of a meshing pair of pinion gears 46 supported in associated pockets 48. The teeth 50 of the pinion gears 46 are in meshing relationship with the teeth 44 of an output gear 40.

At least one of the output gears 40 includes a hub, generally indicated at 52, having a tapered portion 54 facing an adjacent opening in the cover 22. Similarly, at least one of the covers 22 defines an inner frustroconically-shaped or chamfered portion 56 that corresponds to an adjacent tapered portion 54 on the hub 52 of one of the output gears 40. In the embodiment illustrated in the figures, each of the output gears 40 includes a hub 52 having a tapered portion 54 facing an adjacent opening in the cover 22. Likewise, each of the covers 22 defines an inner frustroconically-shaped or chamfered portion 56 that corresponds to an adjacent tapered portion 54 on the hub 52 of the corresponding output gear 40. As will be described in greater detail below, the gear case 16 and gear set 38 cooperate to move the output gears 40 such that the tapered portion 54 is disposed in frictional, torque translating engagement with the chamfered portion 56 on an adjacent, corresponding cover 22 to bias the torque translated through the differential to the half shafts under certain predetermined conditions. However, those having ordinary skill in the art will appreciate from the description that follows that the differential gear mechanism of the present invention may operate where only one of the output gears includes a tapered portion 54 that is disposed adjacent to an inner frustroconically-shaped or chamfered portion 56 on the opening in the covers 22. Nevertheless, the description that follows is made in reference to the embodiment illustrated in the figures having tapered portions 54 on each of the output gears 40 that face the chamfered portion 56.

Figure 3:
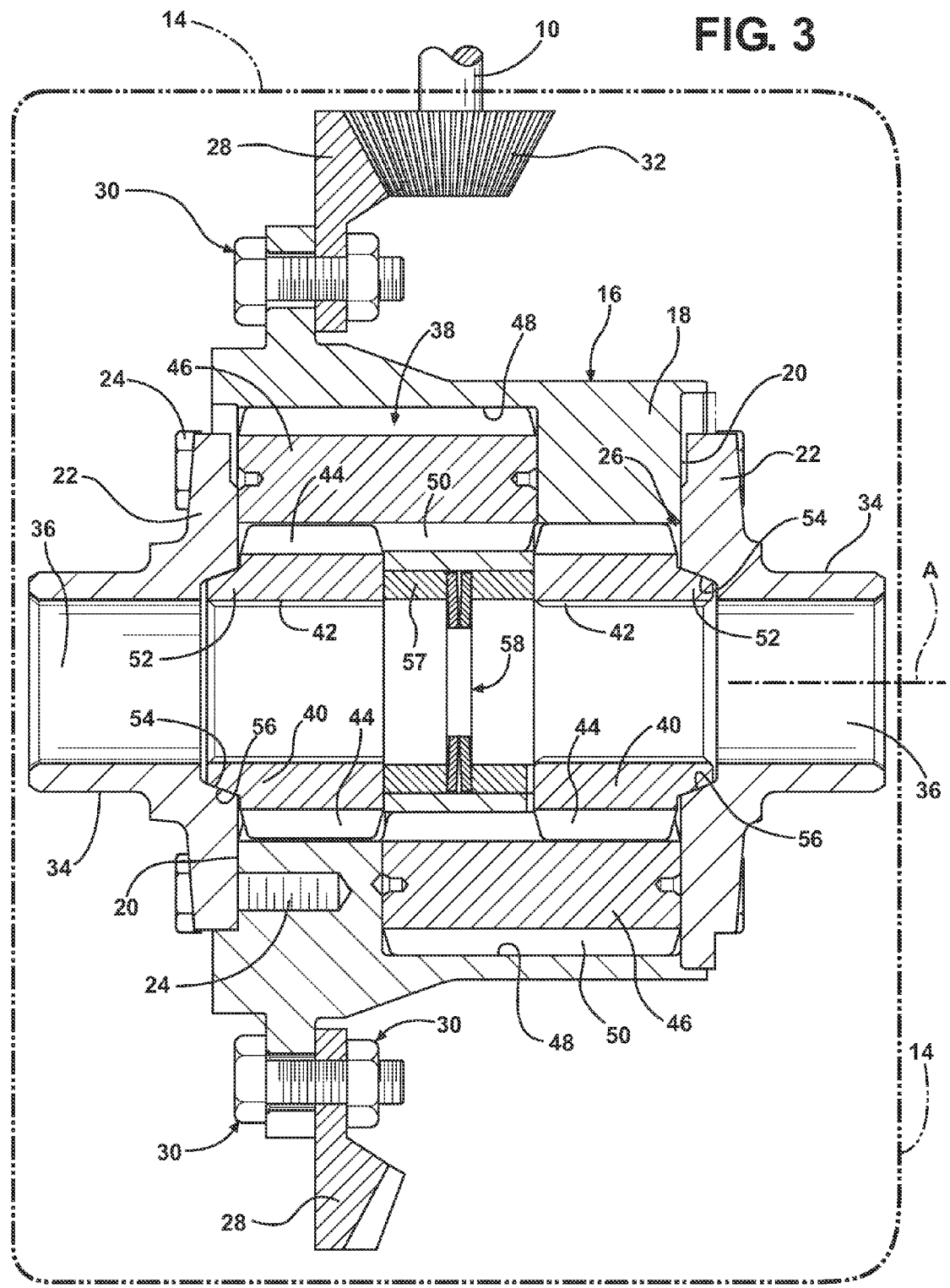
FIG. 3 is a cross-sectional side view of the gear case of the present invention illustrating the torque translating frictional contact between the pair of output gears and the cover of the gear case.
Figure 4:
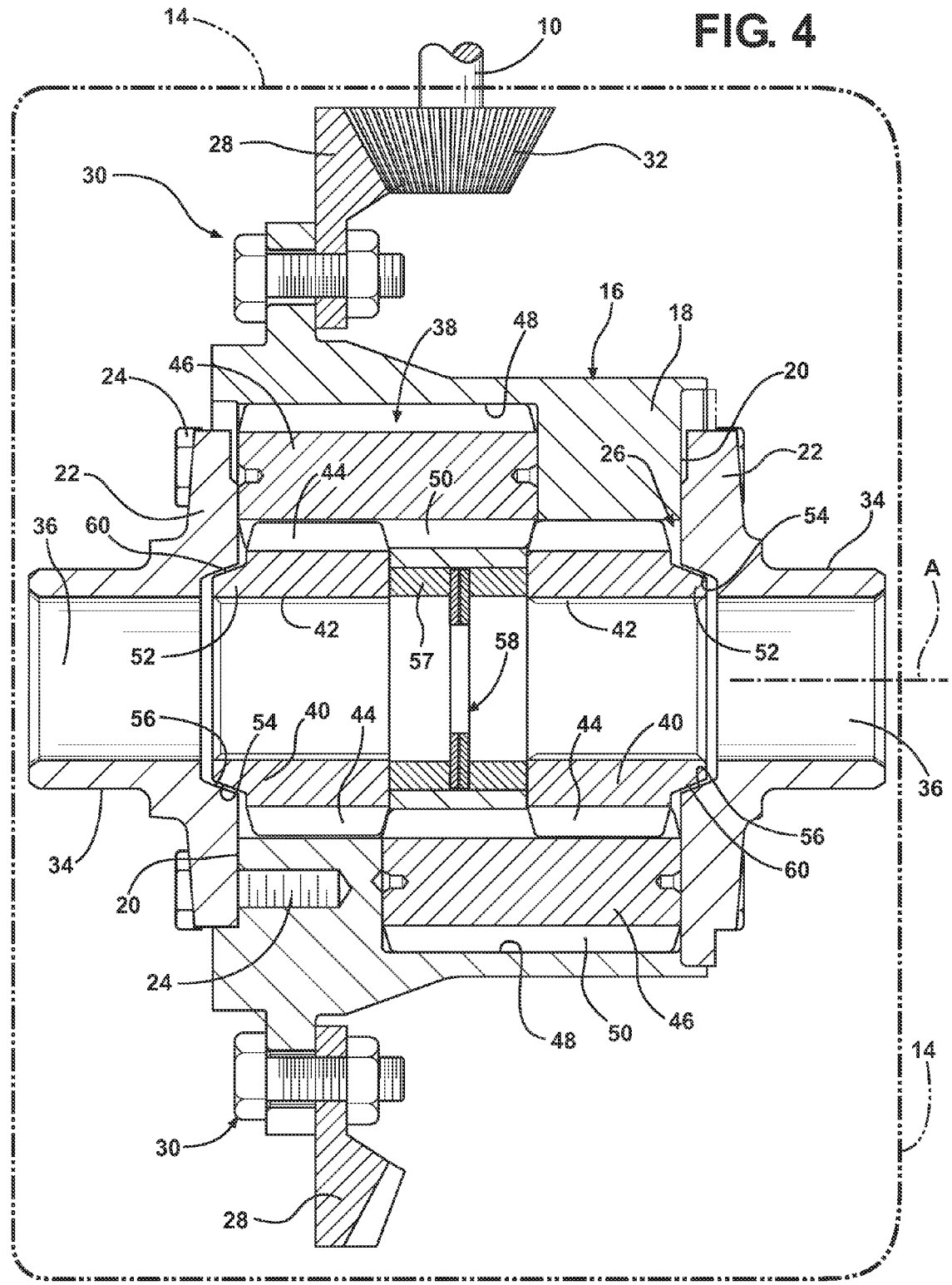
FIG. 4 is a cross-sectional side view of the gear case of the present invention illustrating the output gear and cover in non-contacting relationship.

More specifically, a thrust spring, generally indicated at 58, is disposed between the pair of spacers 57. In turn, the thrust spring 58 and spacers 57 are located between the pair of output gears 40 and act to bias each of the output gears 40 away from one another and toward an adjacent cover 22. The gear case 16 and gear set 38, including the pinion gears 46 and the output gears 40, cooperate to generate an inward thrust force acting through the output gears 40 against the biasing force of the thrust spring 58 when the torque requirements for the half shafts are substantially same. This circumstance occurs under normal forward driving conditions, for example, while the vehicle is heading in a straight line and all tires are solidly supported. Under these conditions and as best shown in FIG. 4, the pinion gears 46 do not differentiate and the inward thrust force moves the output gears 40 toward one another and produces a gap 60 between the tapered portion 54 of the hub 52 in the chamfered portion 56 of the associated cover 22. Under other predetermined conditions and as best shown in FIG. 3, the gear case 16 and the gear set 38, including the pinion gears 46 and the output gears 40 cooperate to reduce the inward axial thrust in response to differential torque requirements at the half shafts. Under these operational conditions, the bias generated by the thrust spring 58 moves the output gears 40 toward respective adjacent covers 22 and the tapered portion 54 into frictional, torque translating contact with an associated chamfered portion 56 on the covers 22 to increase the torque translated through the differential to the half shafts. This can occur, for example, when one tire is solidly supported and the other is not such that the unsupported tire would have a tendency to spin in the absence of the torque sensitive, torque biasing differential of the present invention.

In operation, the drive shaft 10 provides torque to the gear case 12 via the ring gear 28. Under normal operating conditions, the half shafts are driven at the same speed through the drive pinion 32, ring gear 28, gear case 12, pinion gears 46 and output gears 40. Thus, the drive torque applied to the ring gear 28 is distributed through the two parallel torque delivery paths which include meshing pairs of differential pinions 46 thereby introducing radial gear tooth loading on the pinions 46. This loading results in frictional resistance owing to the rotation of the pinion gears 46 in the associated pockets 48 formed in the flange body 18. Because of the helical angle of the gear teeth on the pinions 46 as well as the output gears 40, a thrust force is produced on the pinion gears 46 causing frictional resistance due to the engagement of the pinion gears 46 with the ends of their respective pinion pockets 48. Under certain predetermined conditions, such as when the vehicle is driving straight down the road, inward thrust forces are introduced on the thrust spacers 57 and spring 58 as a result of the axial gear tooth loading on the two output gears 40. This drives the output gears 40 inwardly toward one another and away from the associated covers 22 as illustrated, for example, in FIG. 4. This inward thrust force produces a gap 60 between the tapered portion 54 of the hub 52 and the chamfered portion 56 of the associated cover 22. Thus, the hub 52 of the output gears 40 are disposed in non-contacting relationship with respect to the associated cover. Under these conditions, the pinions 46 do not differentiate and no torque transferred between the tapered portion 54 and the corresponding chamfered portion 58 on the cover 22. While the gap 60 is illustrated in FIG. 4 and the hub 52 of the output gear 40 is described in "non-contacting relationship" with respect to an associated cover, those having ordinary skill in the art will appreciate that some minor contact may exist between the hub and the cover under the operating conditions described above, but that no substantial torque is translated between these components.

However, under other operating conditions, such as when one tire is solidly supported and the other is not such that it spins, one output gear 40 will apply more resistance to the torque driving the pinion 32. Under these circumstances, the mating pinion gears 46 tend to separate from the output gear 40 and wedge into the pockets 48 in the flanged body 18. As the input torque increases, the wedging of the pinion gears 46 in the pockets 48 of the flanged body 18 also increases. As the coefficient of friction under each of the driving wheel varies, the amount of torque distributed to each wheel is automatically proportioned so that wheel slip under the tire with the poorest traction will be limited. At the same time, the gear case 12 and gear set 38, including the pinion gears 46 and output gears 40, cooperate to reduce the inward axial thrust in response to the differential torque requirements at the half shafts. Thus, the bias generated by the thrust spring 58 moves the output gears 40 toward respective adjacent covers 22 and the tapered portion 54 into frictional, torque translating contact with an associated chamfered portion 56 on the covers 22, as illustrated in FIG. 3. The frictional engagement between the tapered portions 54 and the chamfered portions 56 on the associated output gear 40 and covers 22, acts to increase the torque translated through the differential to the half shafts. In this way, more torque is translated to the solidly supported tire, for example, thus increasing the efficiency of the torque-proportioning differential.

The invention has been described in great detail in the foregoing specification, and it is believed that various alterations and modifications of the invention will become apparent to those having ordinary skill in the art from a reading and understanding of the specification. It is intended that all such alterations and modifications are included in the invention, insofar as they come within the scope of the appended claims.

I claim:

1. A differential gear mechanism for supplying torque from a drive shaft to a pair of aligned output shafts, said differential gear mechanism comprising:
    a gear case including a body that defines a gear chamber having a pair of opposed openings adapted to support a corresponding pair of axle half shafts defining an axis of rotation;
    a gear set including a pair of output gears rotatably supported in said gear chamber adjacent to a corresponding opening;
    each of said output gears including a hub having a tapered portion facing an adjacent opening and each of said openings defines an inner chamfer portion that corresponds to an adjacent tapered portion on said hub of one of said output gears, said differential gear mechanism further including a thrust spring disposed between said pair of output gears and acting to bias each of said output gears away from one another and toward an adjacent chamfer portion;
    said gear case and said gear set cooperating to move said output gears such that said tapered portion is disposed in frictional, torque-translating engagement with said chamfer portion of an adjacent, corresponding opening to bias the torque translated through the differential to the half shafts under predetermined conditions; and
    said gear case and said gear set cooperating to generate an inward thrust force acting through said output gears against the biasing force of said thrust spring when the torque requirements for the half shafts are substantially the same such that said tapered portion of said output gears are disposed in substantially non-contacting relationship with its associated chamfer portion.

2. A differential gear mechanism as set forth in claim 1 wherein said gear case and said gear set cooperate to reduce said inward axial thrust in response to differential torque requirements at the half shafts such that said bias generated by said thrust spring moves said output gears toward respective adjacent opening and said tapered portion into frictional, torque translating contact with an associated chamfer portion to increase the torque translated through the differential to the half shafts under predetermined conditions.

3. A differential gear mechanism as set forth in claim 1 wherein each of said output gears includes a splined inner diameter that cooperates with corresponding splines on the half shafts for rotation therewith.

4. A differential gear mechanism as set forth in claim 1 wherein each of said output gears includes an outer diameter and having helical gear teeth formed on said outer diameter.

5. A differential gear mechanism as set forth in claim 1 wherein said gear set includes a plurality of pinion gears rotatably supported in said gear chamber wherein at least some of said plurality of pinion gears is in meshing engagement with at least one of said pair of output gears.

6. A differential gear mechanism as set forth in claim 5 wherein said body includes a plurality of pinion pockets, each of said plurality of pinion gears rotatably supported in an associated pocket in said body.

7. A differential gear mechanism as set forth in claim 5 wherein each of said plurality of pinion gears includes an outer diameter having helical gear teeth formed thereon.

8. A differential gear mechanism as set forth in claim 1 wherein said body includes a pair of opposed ends and a pair of covers are operatively mounted to respective ones of said pair of ends of said body so as to define said gear chamber.

9. A differential gear mechanism as set forth in claim 8 wherein each of said covers defines said opening and a central passage adapted to rotatably support respective half shafts.

10. A differential gear mechanism for supplying torque from a drive shaft to a pair of aligned output shafts, said differential gear mechanism comprising:
    a gear case including a body that defines a gear chamber having a pair of opposed openings adapted to support a corresponding pair of axle half shafts defining an axis of rotation;
    a gear set including a pair of output gears rotatably supported in said gear chamber adjacent to a corresponding opening;
    a plurality of pinion gears rotatably supported in said gear chamber wherein at least some of said plurality of pinion gears are in meshing engagement with at least one of said pair of output gears;
    each of said output gears including a hub having a tapered portion facing an adjacent opening and each of said openings defines an inner chamfer portion that corresponds to an adjacent tapered portion on said hub of one of said output gears, said differential gear mechanism further including a thrust spring disposed between said pair of output gears and acting to bias each of said output gears away from one another and toward an adjacent chamfer portion;
    said gear case, plurality of pinion gears and said output gears cooperating to move said output gears such that said tapered portion is disposed in frictional, torque-translating engagement with said chamfer portion of an adjacent, corresponding opening to bias the torque translated through the differential to the half shafts under predetermined conditions; and wherein said gear case, pinion gears and output gears cooperating to generate an inward thrust force acting through said output gears against the biasing force of said thrust spring when the torque requirements for the half shafts are substantially the same such that said tapered portion of said output gears are disposed in substantially non-contacting relationship in its associated chamfer portion.

11. A differential gear mechanism as set forth in claim 10 wherein said gear case, pinion gear, and output gear cooperate to reduce said inward axial thrust in response to differential torque requirements at the half shafts such that said bias generated by said thrust spring moves said output gears toward respective adjacent opening and said tapered portion into frictional, torque translating contact with an associated chamfer portion to increase the torque translated through the differential to the half shafts under predetermined conditions.

12. A differential gear mechanism as set forth in claim 10 wherein each of said output gears includes a splined inner diameter that cooperates with corresponding splines on the output shafts for rotation therewith.

13. A differential gear mechanism as set forth in claim 10 wherein each of said output gears includes an outer diameter and having helical gear teeth formed on said outer diameter.

14. A differential gear mechanism as set forth in claim 10 wherein said body includes a plurality of pinion pockets, each of said plurality of pinion gears rotatably supported in an associated pocket in said body.

15. A differential gear mechanism as set forth in claim 10 wherein each of said plurality of pinion gears includes an outer diameter having helical gear teeth formed thereon.

16. A differential gear mechanism as set forth in claim 10 wherein said body includes a pair of opposed ends and a pair of covers that are operatively mounted to respective ones of said pair of ends of said body so as to define said gear chamber, and each of said covers defines said opening and a central passage adapted to rotatably support respective half shafts.

* * * * *